(No Model.)  5 Sheets—Sheet 1.
J. W. RENO.
ELECTRICAL RAILWAY CONDUIT AND CURRENT PLOW.
No. 412,666.  Patented Oct. 8, 1889.
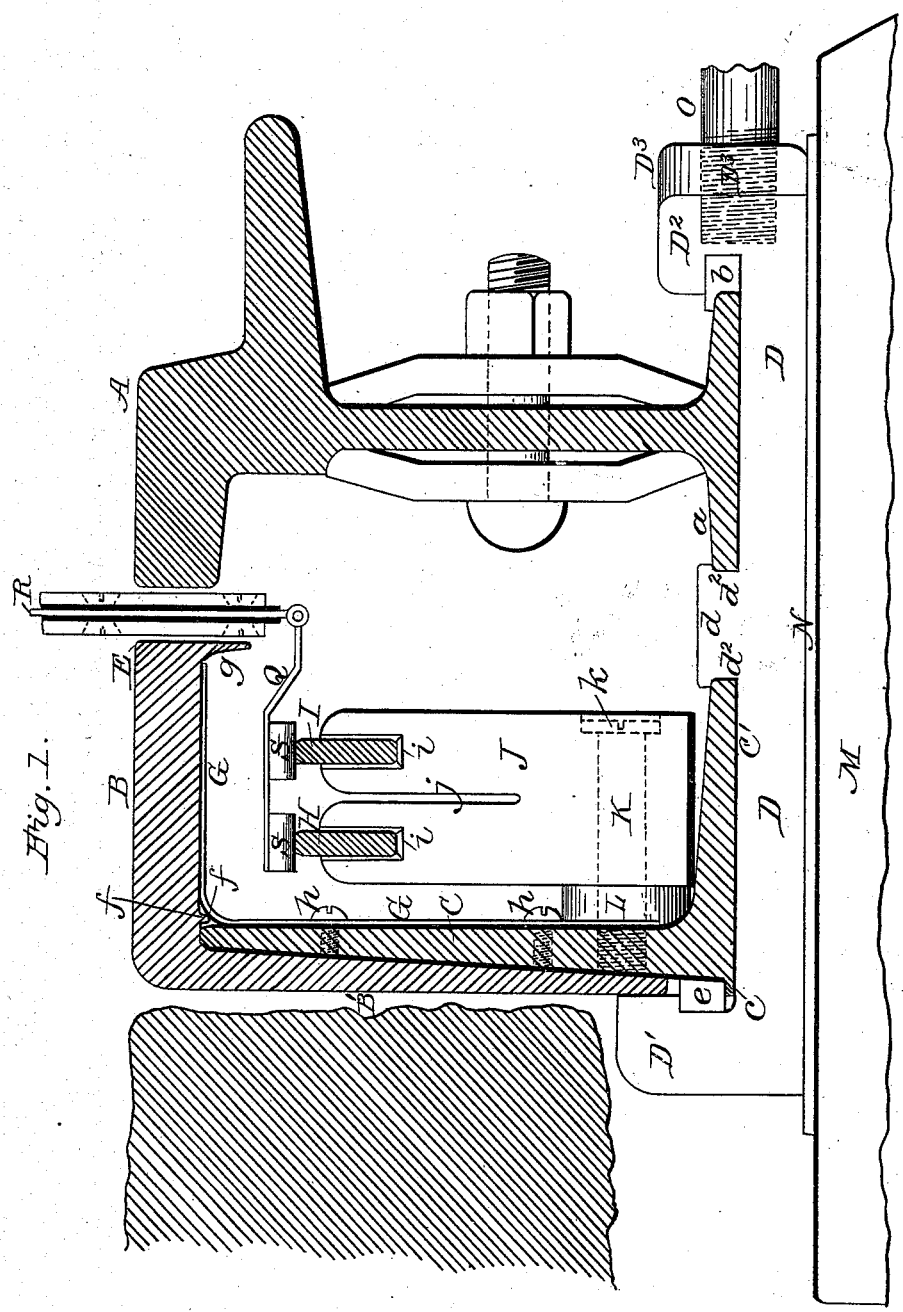
Witnesses
Inventor Jesse W. Reno
By his Attorneys

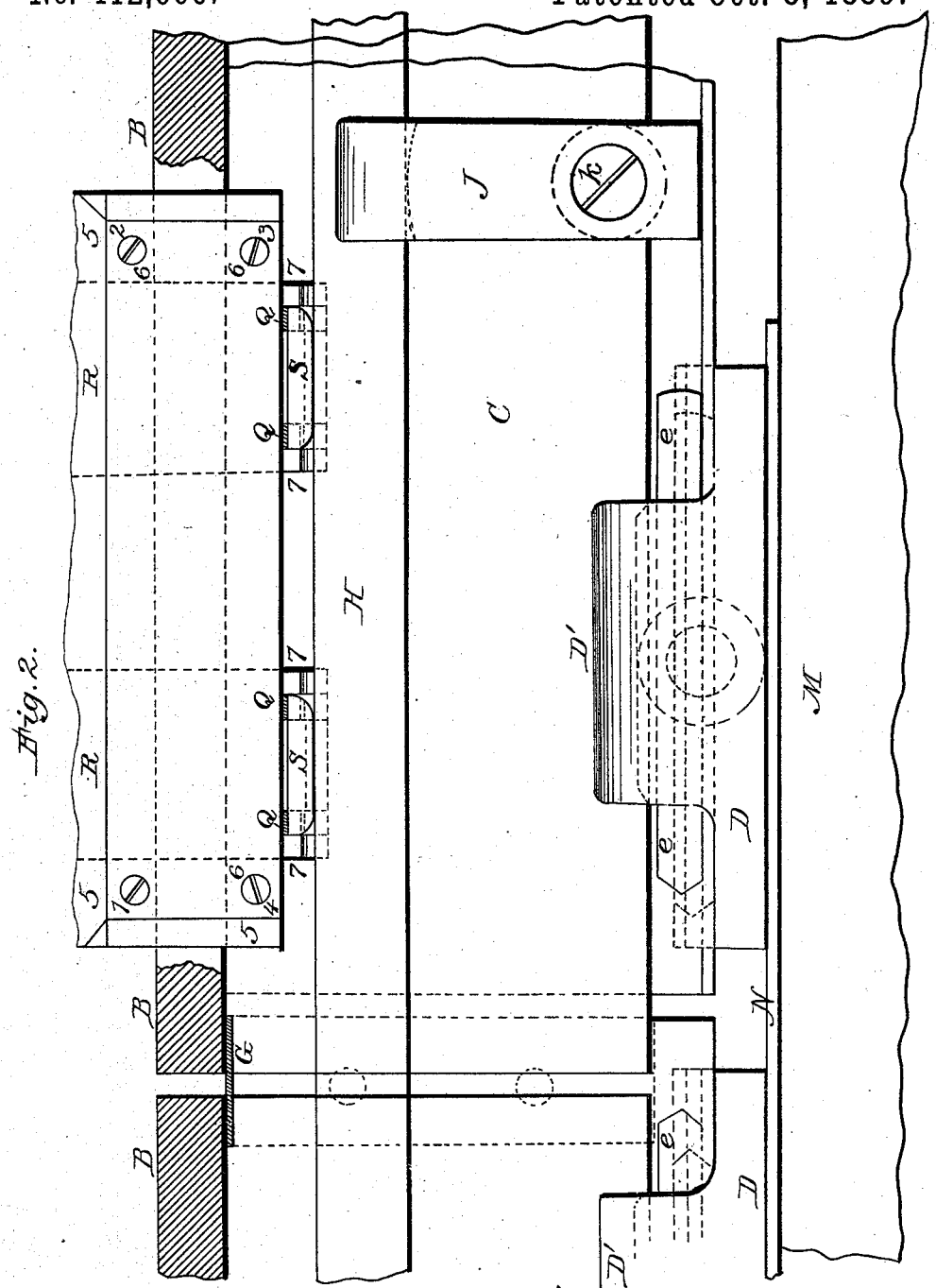

(No Model.)
J. W. RENO.
ELECTRICAL RAILWAY CONDUIT AND CURRENT PLOW.
No. 412,666. Patented Oct. 8, 1889.
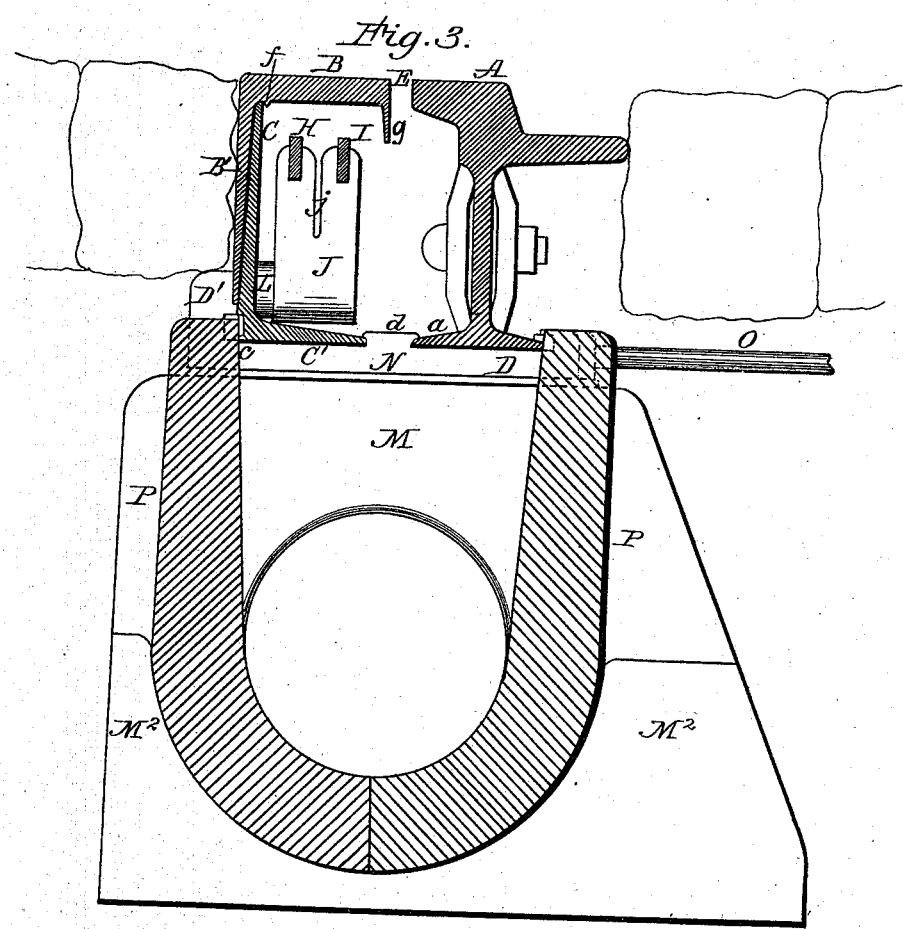

(No Model.)  5 Sheets—Sheet 4.
J. W. RENO.
ELECTRICAL RAILWAY CONDUIT AND CURRENT PLOW.
No. 412,666.  Patented Oct. 8, 1889.
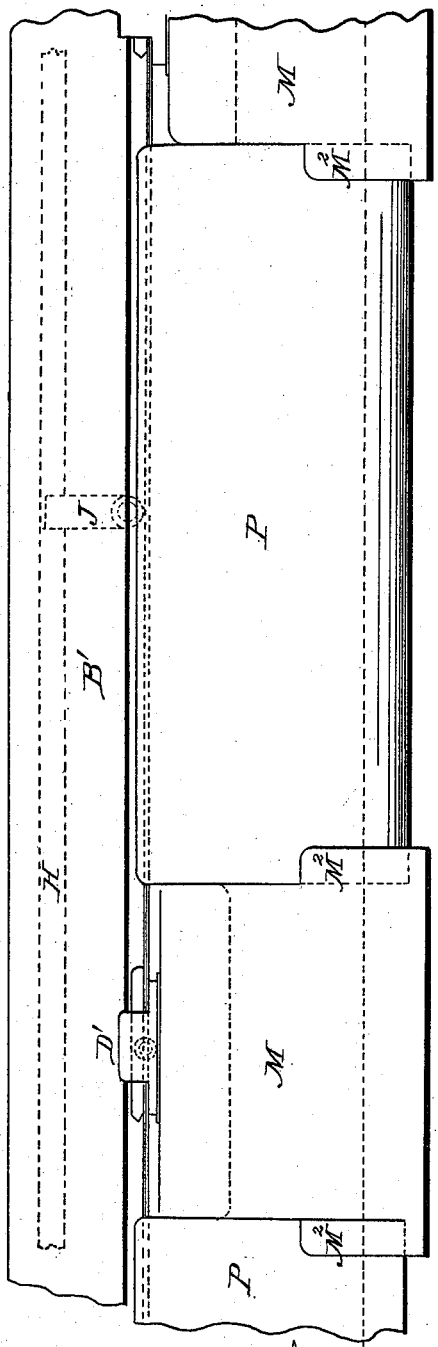
Witnesses  Inventor
  Jesse W. Reno
  By his Attorneys

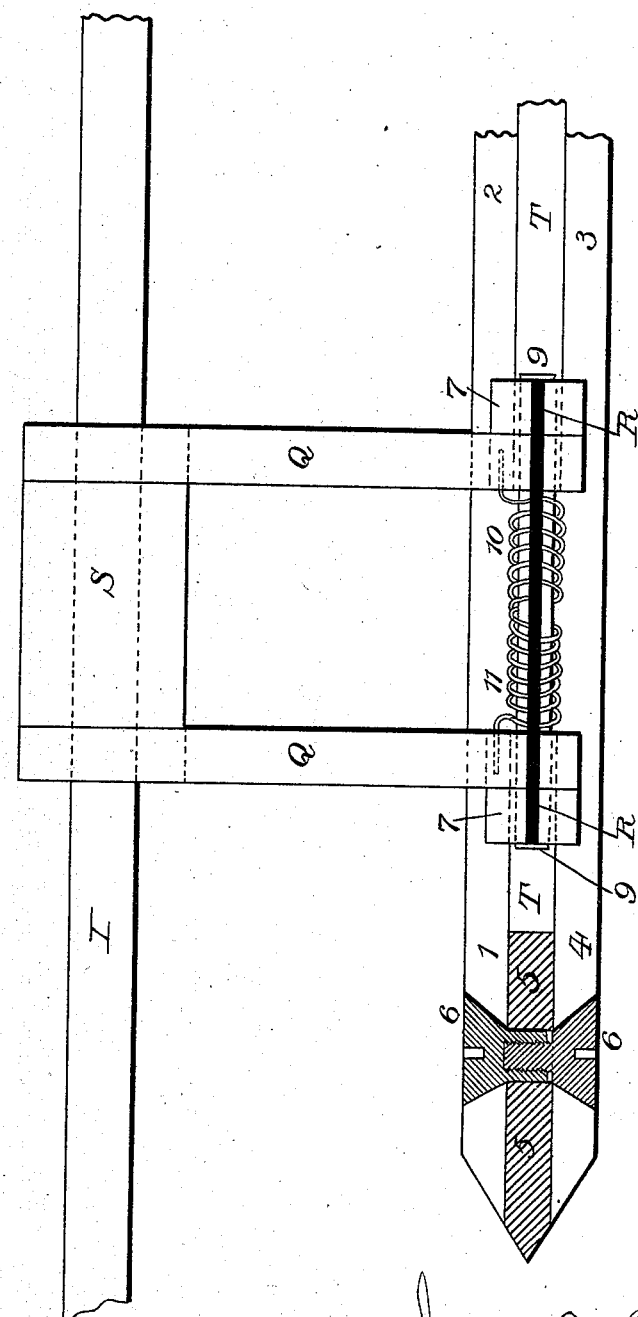

UNITED STATES PATENT OFFICE.

JESSE W. RENO, OF DENVER, COLORADO.

ELECTRICAL-RAILWAY CONDUIT AND CURRENT-PLOW.

SPECIFICATION forming part of Letters Patent No. 412,666, dated October 8, 1889.

Application filed April 29, 1889. Serial No. 309,013. (No model.)

*To all whom it may concern:*

Be it known that I, JESSE W. RENO, a citizen of the United States, residing at Denver, Colorado, have invented new and useful Improvements in Electrical-Railway Conduits and Current-Plows, of which the following is a specification.

My invention is directed to improvements in electric railways in which the electric conductors are housed in underground conduits and connect with those devices attached to the car which serve to lead the electrical current to and from the motor placed thereon.

The objects of my invention, among other things, are to provide an electrical conduit for street-railways which will have the advantage in use of that form of rail known as the "girder-rail," which I utilize as part of the conduit, and thereby dispense with the expensive yokes and concrete foundation which is necessary in the use of other forms of conduit. The girder-rail is conceded to be the best form of construction for city streets, and its adaptation for electrically-propelled cars is important, as such cars are heavier and run at higher speed than the horse-cars. I also utilize in my invention, to form part of the conduit-drain, the "foundations" of the girder-rail next to the conduit. Thus the two necessary parts of a street-railway—namely, the girder-rail and the foundation—in my invention form nearly half of the necessary parts of the conduit, which greatly diminishes its expense. In my construction the cover-plate or slot-rail of the conduit can be easily removed by lifting it up without unscrewing any bolts or disturbing the paving of the street, and in such removal a plain view is afforded of the conductors and insulators, while not in the least interfering with passing cars.

By locating the electrical conductors and insulators within the conduit in the positions shown I am enabled to thoroughly protect them from the mud, water, &c., that may drip or be splashed through the slot. Such arrangement also gives the advantage of having one set of insulators and their fixtures answer for both conductors.

As seen in the drawings, my improvement permits the street-paving to be laid next to the conduit without beveling, and by locating the conduit-slot at the side of the rail it causes no extra break in the pavement, and, besides, is situated in the driest and cleanest part of the street and where the wear is least, while the brush or scraper of the car provided for cleaning the track will also keep the slot free from obstructions.

While building this railway and conduit the usual traffic of the horse-cars may continue until the electric system is completed.

Having stated some of the advantages due to my invention, I will now explain my invention in its various matters of construction, arrangement, and combination of parts and devices in connection with the drawings.

Figure 1 shows a cross-section of the conduit with the electrical operating appliances therein, the line of section being indicated at A B in Fig. 2, which is a side elevation at the joint of a portion of the conduit, showing the operating appliances therein. Fig. 3 is a cross-section of my improved electrical conduit, showing its connection with the drain; and Fig. 4 is a side elevation of the same. Fig. 5 is a plan view of the plow and its connected shoe.

The girder-rail A, as seen in Fig. 1, overhangs the inner foot-flange $a$, the object of which will be hereinafter stated.

B is the angle slot-rail or cover-plate of the conduit, and C is the supporting angle-plate for the slot-rail or cover, and to which supporting-plate the insulators holding the copper conductors are attached.

The angle slot-forming rail and its angle-supporting plate constitute the casing of my conduit, and are each formed of an L-shaped bar in cross-section, and are made in lengths corresponding to the lengths of the rails, which are usually thirty feet, and in which the joints of the cover-supporting angle-plates will be in line with the joints of the rails, while the slot-forming rails or cover-plates will break joints with its supporting-plates, for a purpose to be presently stated. The vertical parts B' and C of these angle conduit-plates lap each other, the vertical cover part B' being on the outside of its vertical supporting part C, upon the upper edge of which the slot-rail or cover-plate rests. The cover-supporting angle-plate C and the rail A are rigidly keyed together by clamping-chairs D, which are preferably of cast-iron, so that the rail and the conduit-forming part C, keyed thereto, will be free to expand and contract as one piece. A simple way of effecting such keying by chairs is shown in Fig. 1, in which the chair is formed with a top ridge $d$, standing parallel with the rail and formed with a groove $d^2$ on each side, into which are fitted the inner flange $a$ of the rail A and the base or flange C' of the cover-supporting plate. At each end the "chair" has parts D' and $D^2$ turned upwardly and inwardly, which form lock-abutments, to one of which the outer flange of the rail is secured by a grooved key $b$, binding in the lock of the abutment and against and over the edge of the rail-flange. The lock-abutment D' at the other end of the chair is also adapted to receive a key $e$, which, being driven in between the lock end of said abutment and a flange $c$ on the outside at the base of the cover-supporting angle-plate, rigidly binds the latter to the chair. This construction allows the rail and the cover-supporting angle part C to be removed independently of each other for renewal or for other cause.

Referring now to the top locking-ridge $d$ of the chair, it will be seen that the inner flange $a$ of the rail and the base-flange C' of the cover-supporting angle part are kept apart a greater distance than the width of the slot, and that the centers of these two spaces are in line. This permits anything that falls through the slot to drop clear through into the conduit-drain, leaving that part of the conduit containing the insulators clear and dry.

The slot-forming-cover part B has its top part made heavy, in order to stand the wear of street traffic, and it is held in its position resting against and on the upwardly-projecting part C by means of a flange or ridge $f$ on its under side and the lock-abutment D' of the chair standing up against the lower edge part of the vertical part B' of said cover part. This vertical cover part tapers, as shown, and fits loosely between the chair-abutment D' and the cover-supporting part B', and thereby permits of the ready removal of the cover or slot-forming part for inspecting or repairing the conductors or insulators. Of course the weight of the cover part or slot-rail (being about five hundred pounds) will prevent its being removed maliciously.

To prevent the water dripping down through the slot from running back on the under side of the cover part of the conduit and dropping upon the conductors and insulators, or from splashing diagonally through the slot E onto these parts, I provide or form the cover part at the lower edge of its slot-forming side with a flange or ridge $g$, extending down into the conduit a sufficient distance to shield the parts, as stated. I prefer to roll this drip-flange and shield in the rail and to make it flush with the wall of the slot.

At one end of the cover-supporting part of the conduit, and on the inner wall thereof, is attached a hood or shield G by screws $h$, and it extends under the joint between the ends of the cover parts and prevents dirt, &c., from dropping through the joint upon the conductors, while it does not interfere with the expansion and contraction of the cover parts.

The conductors H and I are preferably in rail lengths, and may be joined with an expansion-joint about at the rail-joints, so that their expansion and contraction, producing a sliding in their slots in the insulators J, are reduced to a minimum. The grooves or slots $i$ in the insulators, in which the conductors J rest, have convex curved surfaces or bearings, so as to increase the freedom for longitudinal movement of the conductors and also to increase the insulation. The slit $j$ in the insulator is for increasing the insulating-surface between the conductors. This arrangement permits of the use of one insulator and its necessary attachments to support both conductors and at the same time have a maximum insulation. The insulators J, preferably made of hard porcelain, are supported and attached to the inner side of the cover-supporting part C in the following manner: A bolt K, which has a thread on one end and a screw-head $k$ on the other, is passed through a bore in the lower portion of the insulator J, and is screwed into the vertical cover-supporting part C, as shown. A flexible or rubber washer L and the insulator are placed upon the bolt, and the latter, being driven in with its head against the outer edge of the insulator, binds the latter against the flexible or rubber washer. The insulator extends down below the bolt, and is preferably made with a square end, so as to conform to and be sufficiently close to the surface of the base-flange of the cover-supporting part to prevent it from turning on the bolt, and it is therefore held rigidly in place.

I prefer to countersink the head of the bolt in the insulator and to fill the space with a covering of insulating material, which, while it will prevent the bolt-head from rusting, will also increase the insulation.

The clamping-chair D has interposed between it and the foundation M a plate N, upon which it can slide as the rail and conduit longitudinally expand and contract. It may also have a projection or boss $D^3$ cast on its end $D^2$, which has a threaded hole in which a rod O screws, while the other end of the latter screws into a chair keyed to the other rail, and serves to keep the two rails at the required distance apart, and at the same time this rod is sufficiently low down not to interfere with the laying of the street-pavement between the rails.

In Figs. 3 and 4 I have shown the method by which are utilized the foundation-pieces M for a continuous drain for the conduit.

These foundation-pieces M, I make, preferably, of artificial stone, with a longitudinal hole molded in them and of the shape shown, so that the base broadens out and makes the foot-flange of the girder-rail bear directly above the center of it. These foundation-pieces have the projecting shoulders M², which extend under and support the drain-pieces P, which complete the conduit-drain. I prefer to make these drain-pieces P separate, as shown, so as to more easily allow the drain to be put together and repaired. These drain-pieces are so shaped that when they are put in position, resting upon the shoulders M², their inner surfaces are flush with the lower half of the hole in the foundation M and makes, with these holes, a continuous and non-rusting drain.

The upper and inner edges of the drain-pieces P bear against the outer flange of the rail A and the base-flange C' of the cover-supporting plate, so that when the earth is packed about them they are tightly pressed together where they join at the bottom and are held rigidly against the said flanges. These drain-pieces P are preferably made of ordinary drain-pipe clay hard baked, and their shape permits of their being easily manufactured and packed for transportation. In fact, the general construction of this conduit and railway allows of its being rapidly and comparatively inexpensively built at all seasons, and at the same time offers the least amount of obstruction to street traffic. If desired, the conduit and rail may be used for the return-current, thus dispensing with one of the conductors, its supporting-insulator part and contact-shoe, &c., on the plow.

The following is a description of the plow and its attachments, which take the positive and the negative electric currents from the conductors H I and lead them to the motor on the car.

Referring to Figs. 1, 2, and 5, and particularly to the latter, will be plainly seen my method of attaching the contact shoe-arms Q to the flat copper strips R, which are inclosed in and insulated from the metallic exterior of the plow, and also from each other, by the insulating material. In constructing the plow I prefer to make the two outside plates 1 2 3 4, (see Fig. 2,) which take the wear in rubbing against the sides of the slot, separate from the main part of the plow, so that the wearing part may be cheaply renewed. These plates are clamped to the solid ends 5 5 of the plow by the male and female screws 6 6, or by rivets. Fig. 5 shows that end of the plow to which one contact-shoe is attached, the other end being similar to it, so that one description will answer for both. The lower end of the copper strip has attached to it the pieces 7 7, through which and the enlarged ends of the arms Q passes the rod 9, thus hinging the contact-shoe S upon the copper strip R. Coiled about the rod 9 are the two coil-springs 10 11, the middle ends of which bear upon the lower edge of the copper strip R, while the outer ends are fastened in the holes in the enlarged ends of the arms Q, as shown. These springs cause the contact-shoes S to exert a gentle pressure upon their respective conductors H and I and allow them to follow and maintain electrical contact with them independently of any motion of the plow. If advisable, these hinge plow parts may be inclosed in insulating material, thus protecting them from moisture, &c., which may collect at the lower part and interfere with the insulation.

While the slot-forming-conduit part is supported so as to be readily removed when found necessary, its engagement with the fixed conduit part C is such as to maintain a uniform width of the slot.

The method of locking the rail and conduit-forming parts together avoids the use of bolts and nuts.

I claim as my invention—

1. In a conduit for electric railways, the combination, with the girder-rail, of a hollow metal casing composed of a top and a bottom section joined back to back, the bottom section being secured to the base of said rail, and the top section forming with the rail the plow-slot, substantially as described, for the purpose specified.

2. In a conduit for electric railways, the combination, with a girder-rail, of a casing formed with a top plate, a closed side, and a bottom plate arranged at one side of said rail to form a conduit together with the same, forming a slot between said top plate and the head of said rail, and keyed or locked to said rail, substantially as described.

3. In a conduit for electric railways, the combination, with a girder-rail, of a rectangular casing open at one side and secured at the side of said rail to form a conduit together with said rail, locking-chairs clamping the foot of said rail and casing, and keys locking said casing, rail, and chairs, substantially as described.

4. In a conduit for electric railways, the combination of the girder-rail, rectangular casings open at one side and secured at the side of said rail to form a slotted conduit together with said rail, and a drain arranged directly below said rail and conduit forming casing and communicating directly with the latter and the plow-slot, substantially as described, for the purpose stated.

5. In a conduit for electric railways, the combination of a girder-rail, a rectangular plate having a foot-flange C' and a side and arranged at the side of said rail, a rectangular slot-forming plate having a side and a top, and locking-chairs and keys for locking said rail and angle-plates together to form a rectangular slotted conduit, substantially as described.

6. In a conduit for electric railways, the combination of a girder-rail, the angle-plate having the foot-flange C' formed with the rib

*c*, and the side C, the angle-plate B, having the side B' and the top formed with the rib *f*, the locking-chair having the upwardly and inwardly turned lock ends, and the keys *b c*, substantially as described.

7. In a conduit for electric railways, the plow-slot formed by the overhanging head of a girder-rail and the overhanging top plate of the conduit, in combination with a bottom plate forming a support for said overhanging top plate, and means, substantially as described, for securing said supporting-plate to the base of the rail, whereby the said slot-forming plate may be removed and replaced, when desired, for access to the current-transmitting devices, substantially as described.

8. In a conduit for electric railways, the combination of the girder-rail and the slot-forming angle-plates arranged to have their joints register, the angle-plates C, arranged to break joints with said rails, and the hood or shield plates G, secured to one of said angle-plates to cover from the inside the joints of said slot-forming angle-plates, substantially as described.

9. In a conduit for electric railways, the combination, with the conduit, of insulators having bores in their lower ends, screw-bolts inserted through said bores and into the side of said conduit, and flexible or rubber washers interposed between said insulators and the side of the conduit, substantially as described.

10. In a conduit for electric railways, the combination of a girder-rail, a rectangular casing open at one side and arranged at the side of said rail to form a conduit and plow-slot, and insulators and conductors secured to the closed side of said casing under the top plate of the same, substantially as described.

11. In a conduit for electric railways, the combination of a rectangular conduit, insulator-blocks formed with slots or seats in their upper ends, conductors supported in said seats, and bolts inserted through said insulator-blocks and into the side of said conduit, substantially as described.

12. In a conduit for electric railways, an insulator-block for the electric conductors having slots or seats for said conductors and having a deep slit or recess between said seats, substantially as described.

13. In a conduit for electric railways, the combination of the conduit, insulator-blocks having slots in the upper ends and slits or recesses between said slots, bolts inserted through said blocks into said conduit, and flexible or rubber washers upon said bolts between said blocks and conduit, substantially as described.

14. In a conduit for electric railways, the combination, with a girder-rail, of a hollow rectangular casing open at one side and secured with its bottom to the foot of said rail and with its open side opposite the side of the latter and having its top extending toward the tread of said rail to form the plow-slot, substantially as described.

15. In a conduit for electric railways, the plow-slot formed by the overhanging head of a girder-rail and the overhanging top plate of the conduit, and a bottom longitudinal drain-slot for said conduit formed by the bottom plate thereof and the base-flange of said rail, in combination with means, substantially such as described, for fastening the said conduit-forming plates to the said rail.

16. In an electrical-railway conduit, the combination, with a girder-rail, of a hollow metal casing secured to the base of said rail and forming, together with said rail, the plow-slot and the conduit, substantially as described.

17. In an electric-railway conduit, the combination of a rail having an overhanging side head adapted to form one side of the plow-slot and a conduit-forming casing having a removable plate-section forming the other side of said plow-slot and provided with an under shoulder or ridge *f*, and a fixed base-plate section interlocking with said shoulder or ridge, whereby to hold said slot-forming part in fixed relation to the rail to maintain a uniform width of slot.

18. In an electric railway, the combination, with a railway-rail, of a casing formed of a fixed base part and a removable top part and containing the insulated electrical conductors, and both together forming the plow-slot, and the locking chairs, substantially as described.

19. In an electric railway, a conduit having a removable top L-shaped section, in combination with a base L-shaped section, a rail, and a base-locking device for the parts, the vertical sides of the said casing parts being secured together at the upper end of one and at the lower end of the other, whereby to permit the removal of the said slot-forming part without disturbing the paving or the conduit.

20. A street-conduit for electric railways formed of a casing open at one side and forming one side of the plow-slot and a rail closing such open casing side and forming the other side of said plow-slot, and means for binding said casing to said rail, consisting of a chair having lock-connections with the rail-base and with the casing-base, substantially as described.

21. A conduit-forming casing for electric railways, consisting of an L-shaped plow-slot-forming part, combined with a railway-rail forming one side of said conduit-casing and one side of said plow-slot, and means, substantially as described, for binding the conduit-casing to the base of the rail and for supporting the slot-forming parts, substantially as described.

22. In an electric railway, the insulator having vertical slots, a supporting-bolt therefor, and flexible or rubber washer for insulating it from its bolt-supporting wall, in combination with the conductors loosely supported by said insulators and the yielding contact plow-shoes, substantially as described.

23. In an electric railway, the insulator having the conductor-receiving slots and an intervening slot, all open at the top and mounted upon the wall of the conduit in isolated relation thereto, substantially as described.

24. In an electric railway, the conductors for supplying the current for the moving car and for the return-current arranged upon the same side of the conduit, in combination with the contact-shoes, their connected yielding arms, and the plow or current-taker, the said shoes having a pivotal connection with the latter, substantially as described.

25. The combination, in an electric-railway conduit, of a rail and a hollow casing, the two forming the conduit, of cross base-chairs having exterior and interior locks, with the base-flange of the rail and with the base-plate of the casing, whereby the rail and the casing are bound together at intervals along the track.

26. In an electric railway, a plow device for connecting the car-motor with the conductors, consisting of the side wear-plates, the insulated copper plates R, the clamping screws or rivets 6 6, the pintle, the arms hinged upon said pintle, and the shoe carried by said hinged arms, substantially as described.

27. In an electric-railway conduit, the rail, the side casing part C C', and a base-chair having the central locking-ridge $d$ and the locking ends D' D², in combination with the top casing part B B' and the wedge $b\ c$, substantially as described.

28. In an electric-railway conduit, the combination, with a conductor, of the insulator therefor mounted upon the wall of a conduit by means of a bolt and maintained in proper relation to said conductor by means of an angular or square abutting upon the bottom part of said conduit, substantially as described.

29. In an electrical-railway conduit, the combination, with the rail and a hollow casing, both together forming the conduit, the plow-slot, and a bottom drain-slot, of the cross locking-chairs, the foundation drain-pieces, and the open-top drain-sections supported upon said foundation-pieces, substantially as described.

30. In an electric-railway conduit, the combination, with the rail and the conduit-forming-casing parts, of the foundation-pieces M and the drain-pieces P, whereby to form a support and a continuous drain for the conduit, substantially as described.

31. The combination, in an electrical-railway conduit, with the rail, the casing-plates forming the conduit, the locking-chair, and the base-plate N, of the foundation-pieces M, substantially as described, for the purpose specified.

32. The combination, in an electrical-railway conduit, with the rail and the casing-plates forming the conduit, of the foundation-pieces M, having the projecting end shoulders M², and the drain-pieces supported upon said shoulders, substantially as described.

33. In an electrical-railway conduit, the combination of the rail and the casing plates forming the conduit, with the foundation-pieces M, formed with a longitudinal central opening and supporting the conduit, as described, and the drain-pieces supported by said foundation-pieces and opening at the top into the said conduit, substantially as described, for the purpose specified.

34. The combination, in an electric-railway conduit, of the rail and the conduit-casing parts, with the foundation-pieces M, having a longitudinal hole and a base or foot flange broadening out at one side, whereby the center of the foot-flange of the rail will be in vertical line with the middle of the width of said foundation, substantially as described.

35. The combination, in an electric-railway conduit, of the rail and the conduit-casing parts, with the foundation-pieces M and the drain-pieces P, constructed of two side parts curved and joined at the bottoms, open at top, and bearing at their upper edges against the outer flange of the rail and the outer side of the base-casing part, whereby, when the earth is packed about the drain parts, they will be tightly pressed together where they join at the bottom and held rigidly against the said rail-flange and conduit-wall.

36. In an electric-railway conduit, the plow or take-up having a hinged contact-shoe at each end, combined with independent conductors arranged side by side in the same horizontal plane and an insulator having open-top slots and convex bearings for said conductors, substantially as described, for the purpose specified.

37. The combination, in an electric-railway conduit, of two independent conductors arranged side by side, and insulators having open-top confining-seats for the conductors with contact-shoes for the conductors, the plow or take-up, and arms hinged to said plow and carrying said shoes independently of each other for the separate conductors.

38. The combination, in an electric-railway conduit, of two independent electric conductors arranged side by side and a seat-forming insulator for both conductors with independent contact-shoes, the plow or take-up, and arms connecting one of said shoes to each end of the take-up.

In testimony whereof I have hereunto set my hand in the presence of two subscribing witnesses.

JESSE W. RENO.

Witnesses:
JOHN S. GIBONS,
JOHN C. FEBLES.